United States Patent
Chung et al.

(10) Patent No.: US 8,799,934 B2
(45) Date of Patent: Aug. 5, 2014

(54) METHOD FOR CONTROLLING MOVEMENT OPERATION OF TRAY IN OPTICAL DISC DRIVE WITHOUT PHYSICAL SWITCH

(71) Applicant: Hitachi-LG Data Storage Korea, Inc., Seoul (KR)

(72) Inventors: Sunggoo Chung, Seoul (KR); Youngki Kim, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 0 days.

(21) Appl. No.: 13/672,424

(22) Filed: Nov. 8, 2012

(65) Prior Publication Data

US 2014/0130066 A1    May 8, 2014

(51) Int. Cl.
*G11B 17/03* (2006.01)
(52) U.S. Cl.
USPC .......................................... 720/606; 720/602
(58) Field of Classification Search
USPC .................. 720/600–614; 369/30.27, 30.36
See application file for complete search history.

(56) References Cited

U.S. PATENT DOCUMENTS

| | | | |
|---|---|---|---|
| 6,922,378 B2 | 7/2005 | Shen | |
| 2006/0161929 A1 | 7/2006 | De Hoog et al. | |
| 2008/0109833 A1* | 5/2008 | Hung | 720/606 |
| 2008/0109834 A1* | 5/2008 | Mizuno | 720/619 |
| 2010/0146524 A1 | 6/2010 | Loh et al. | |

\* cited by examiner

*Primary Examiner* — Nathan Danielsen
(74) *Attorney, Agent, or Firm* — Birch, Stewart, Kolasch & Birch, LLP (57) ABSTRACT

A method for controlling a tray in an optical disc drive comprises: setting first and second flags for indicating a current state of the tray, the state of the tray including an open state, a closed state and a state in which the tray moves; and controlling a movement operation of the tray, base on values of the two flags and a time when a counter electromotive force is generated in a motor for moving the tray. If a request of performing a tray closing operation in the state in which the tray is opened is received, the tray closing operation is performed, and the value of the second flag is changed. If the counter e.m.f is detected after a first time from the time when the tray closing operation is started, the driving of the motor is stopped, and the value of the first flag is changed.

8 Claims, 6 Drawing Sheets

Figure 1

- Prior Art -

METHOD FOR CONTROLLING MOVEMENT OPERATION OF TRAY IN OPTICAL DISC DRIVE WITHOUT PHYSICAL SWITCH

BACKGROUND

1. Field

This document relates to a method for controlling a tray applied in an optical disc drive (ODD).

2. Related Art

Various optical disc drives (ODDS) for recording or reproducing data on optical discs such as a compact disc (CD), a digital versatile disc (DVD) and a blue-ray disc (BD) are widely spread and used.

Figure 1:
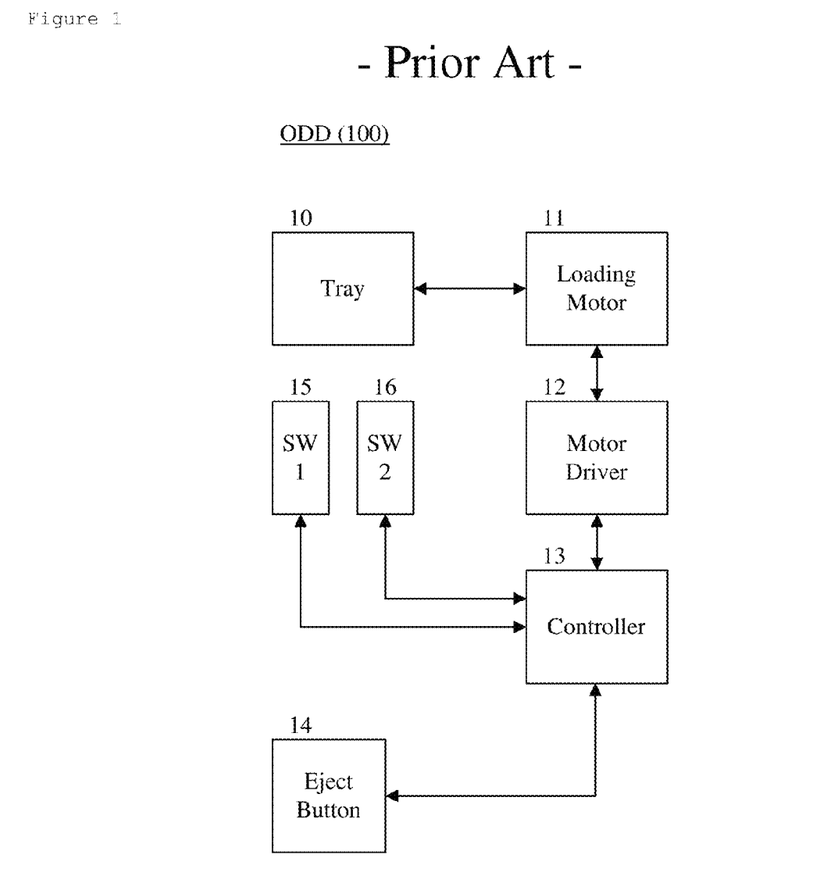
FIG. 1 is a block diagram illustrating a configuration of a general optical disc drive.

For example, as shown in FIG. 1, a general optical disc drive comprises a tray 10, a loading motor 11, a motor driver 12, a controller 13, an eject button 14, a first switch 15, a second switch 16, etc.

If the eject button 14 is pushed by a user in a state in which the tray 10 is inserted into the inside of the optical disc drive, i.e., in a state in which the tray 10 is closed, the controller 13 controls the motor driver 12 to drive the loading motor 11, and the tray 10 is extracted to the outside of the optical disc drive by rotation of the loading motor 11. On the contrary, if the eject button 14 is pushed by the user in a state in which the tray 10 is extracted to the outside of the optical disc drive, i.e., in a state in which the tray 10 is opened, the controller 13 controls the motor driver 12 to rotate the loading motor in the opposite direction, and the tray 10 is inserted into the inside of the optical disc drive by the rotation of the loading motor 11.

While the tray 10 is inserted into the inside of the optical disc drive in the state in which the tray 10 is opened, the state of the first switch 15 is changed from an on-state to an off-state, and the sate of the second switch 15 is maintained as the on-state. Then, if the tray 10 is completely inserted into the inside of the optical disc drive, both the first and second switches 15 and 16 are in the off-state. On the contrary, if the tray 10 is extracted to the outside of the optical disc drive in the state in which the tray 10 is closed, the state of the first switch 15 is maintained as the off-state, and the state of the second switch 16 is changed from the off-state to the on-state. If the tray 10 is completely extracted to the outside of the optical disc drive, both the first and second switches 15 and 16 are in the on-state.

The controller 13 controls an opening/closing operation of the tray 10 by checking on/off-states of the first and second switches 15 and 16.

Figure 2:
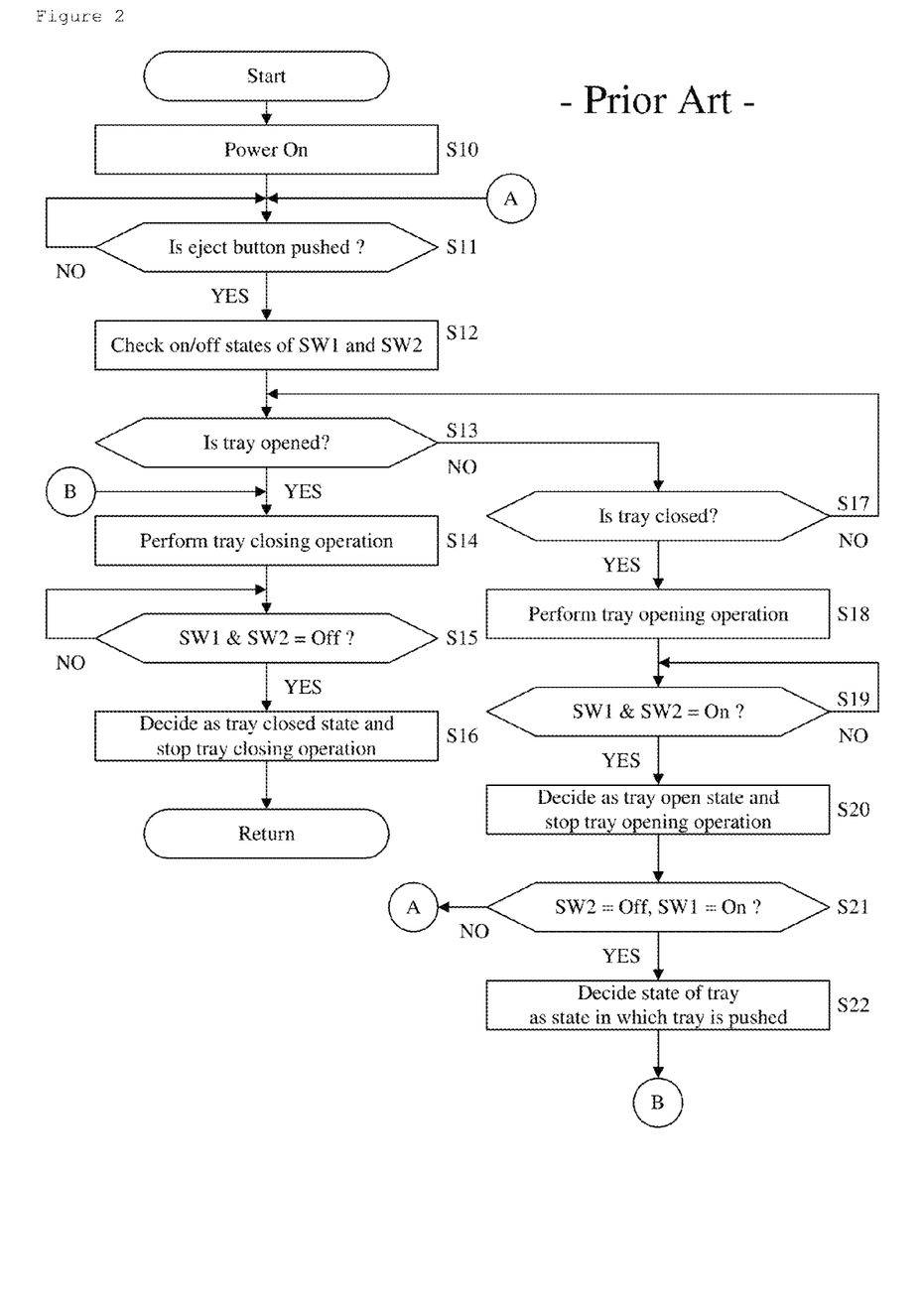
FIG. 2 is a flowchart illustrating a method for controlling a tray in the general optical disc drive.

As shown in FIG. 2, in a state in which power is applied to the optical disc drive (S10), a user pushes the eject button 14 (S11). Then, the controller 13 checks on/off-states of the first and second switches 15 and 16 (S12), and decides an open/close state of the tray 10 according to the on/off-states of the first and second switches 15 and 16. If both the first and second switches 15 and 16 are in the on-state as described above, the controller 13 decides the state of the tray 10 as an open state.

In a case where the state of the tray 10 is decided as the open state (S13), the controller 13 controls the motor driver 12 to drive the loading motor 11, thereby performing a tray closing operation of inserting the tray 10 into the inside of the optical disc drive (S14).

Then, if both the first and second switches 15 and 16 are in the off-state (S15), the controller 13 decides the state of the tray 10 as a state in which the closing of the tray 10 is completed (S16), and stops the driving of the loading motor 11.

On the other hand, if both the first and second switches 15 and 16 are in the off-state at the time when the eject button 14 is pushed, the controller 13 decides the sate of the tray 10 as a state in which the tray 10 is closed.

In a case where the state of the tray 10 is decided as the state in which the tray 10 is closed (S17), the controller 13 controls the motor driver 12 to drive the loading motor 11 in the opposite direction, thereby performing a tray opening operation of extracting the tray 10 to the outside of the optical disc drive (S18).

Then, if both the first and second switches 15 and 16 are in the on-state (S19), the controller 13 decides the state of the tray 10 as a state in which the opening of the tray 10 is completed (S20), and stops the driving of the loading motor 11.

Figure 3:
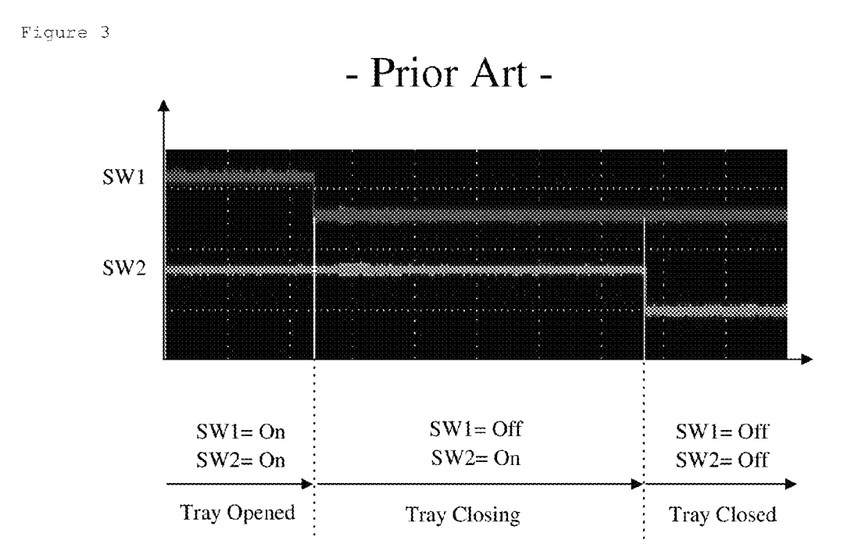
FIG. 3 illustrates changes in on/off state of first and second switches according to the operation of the tray in the general optical disc drive.

Meanwhile, if the user forcibly pushes the tray 10 in the open state, as shown in FIG. 3, the state of the first switch 15 is changed from the on-state to the off-state, and the state of the second switch 16 is continuously maintained as the on-state.

If the first switch 15 is off and the second switch 16 is on (S21) although the eject button 14 is not pushed in the state in which the tray 10 is opened, the controller 13 decides that the tray 10 is forcibly pushed by the user (S22), and performs the tray closing operation described above.

However, since the first and second switches 15 and 16 are necessarily used to control the tray opening/closing operation in the general optical disc drive, manufacturing cost of the optical disc drive increases. Further, if a trouble occurs in at least one of the first and second switches 15 and 16, an error occurs in the tray opening/closing operation.

SUMMARY

An aspect of this document is to provide a method for controlling a tray in an optical disc drive without using separate switches for deciding an open/closed state of the tray.

In an aspect, a method for controlling a tray in an optical disc drive comprises: setting first and second flags for indicating a current state of the tray in the optical disc drive, wherein the state of the tray includes an open state, a closed state and a state in which the tray moves; and controlling a movement operation of the tray, base on values of the two flags and a time when a counter electromotive force (counter e.m.f) is generated in a motor for moving the tray.

In another aspect, an optical disc drive comprises a tray, an eject button, a motor for moving the tray, a timer, a detector for detecting a counter e.m.f generated in the motor, and a controller, wherein the controller sets first and second flags for indicating a current state of the tray, the state of the tray including an open state, a closed state and a state in which the tray moves, and controls a movement operation of the tray, based on values, and controls a movement operation of the tray, based on values of the two flags and a time when the counter e.m.f detected through the timer and the detector is generated.

If a request of performing a tray closing operation (or tray opening operation) in the state in which the tray is opened (closed) is received, the tray closing operation (or tray opening operation) is performed by controlling the motor, and the value of the second flag is changed.

If the counter e.m.f is detected in the motor after a first time from the time when the tray closing operation (or tray opening operation) is started, the driving of the motor is stopped, and the value of the first flag is changed.

If the counter e.m.f is detected in the motor or an eject button is manipulated within a time shorter than the first time from the time when the tray closing operation (or tray opening operation) is started, the tray opening operation (or tray closing operation) is performed by controlling the motor.

The request of performing the tray closing operation (or tray opening operation) is determined by whether the eject button is manipulated or whether the counter e.m.f is detected in the motor within a time shorter than a first time.

A third flag for indicating the movement direction of the tray is set under the movement of the tray, and if it is decided that the movement of the tray is stopped, any one of the values of the first and second flags is changed based on a value of the third flag.

In a method for controlling a tray in an optical disc drive according to the present invention, it is possible to reduce fabricating cost of the optical disc drive without using separate switches and to prevent, in advance, an error from occurring in a tray opening/closing operation due to a trouble of the switches.

DETAILED DESCRIPTION

The above objects, characteristics, and merits of this document will become more apparent from the following detailed description taken in conjunction with the accompanying drawings. This document can be modified in various ways and can have several embodiments. Hereinafter, some of the embodiments are shown in the accompanying drawings and described in detail with reference to the drawings. The same reference numerals, as a general rule, designate the same elements throughout the specification. Further, a detailed description of the known functions or constructions will be omitted if it is deemed to make the gist of this document unnecessarily vague. It is also to be noted that numbers (e.g., first and second) used in the description of this document are only identification symbols for distinguishing one element from the other element. The above and other objects, features and advantages of the present invention will become apparent from the following detailed description taken with the accompanying drawings. As the invention allows for various changes and numerous embodiments, particular embodiments will be illustrated in the drawings and described in detail in the written description. Like reference numerals designate like elements throughout the specification. In the following description, detailed descriptions of well-known functions or constructions will be omitted since they would obscure the invention in unnecessary detail.

Hereinafter, an apparatus and method for controlling a tray in an optical disc drive (ODD) according to an exemplary embodiment of the present invention will be described in detail with reference to the accompanying drawings.

First, first and second switches which are on/off according to the open/close state of the tray are not separately provided to the ODD to which the apparatus and method according to the present invention is applied.

Figure 4:
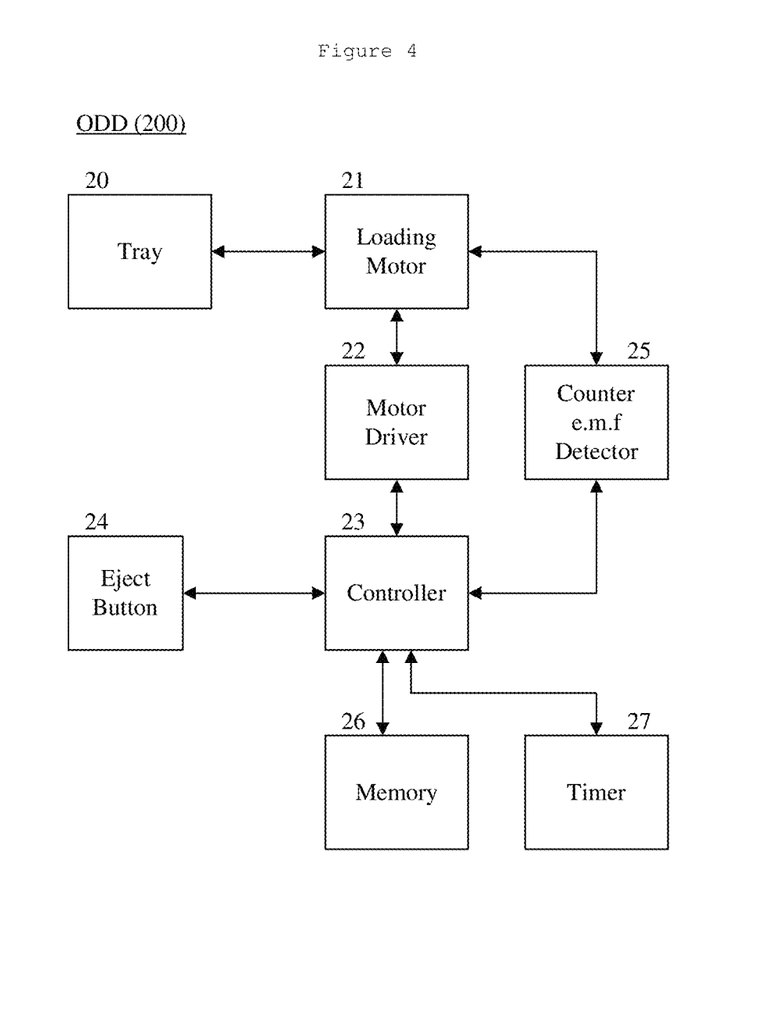
FIG. 4 is a block diagram illustrating a configuration of an optical disc drive to which the present invention is applied.

As shown in FIG. 4, the ODD 200 to which the present invention is applied may comprise a tray 20, a loading motor 21, a motor driver 22, a controller 23, an eject button 24, a counter electromotive force detector 25, a memory 26, a timer 27, etc.

The controller 23 performs a counter electromotive force (counter e.m.f) detection and an algorithm using flags so as to control a tray opening/closing operation. For example, if the tray 20 is in a state in which the tray 20 is closed in the inside of the ODD, the controller 23 sets both first and second flags Flag1 and Flag2 to be in a low state L. If the tray 20 is in a state in which the tray 20 is opened to the outside of the ODD, the controller 23 sets both the first and second flags Flag1 and Flag2 to be in a high state H. In a case where the tray 20 is extracted from the inside to the outside of the ODD, the controller 23 changes the state of the first flag Flag1 from the low state L to the high state H, and maintains the second flag Flag2 to be in the low state L.

In a case where the tray 20 is inserted from the outside into the inside of the ODD, the controller 23 changes the state of the first flag Flag1 from the low state L to the high state H, and continuously maintains the second flag Flag2 to be in the low state L.

The controller 23 confirms an open/close state of the tray 20 by checking the first and second flags set in the memory. The controller 23 controls the motor driver 22 to perform a tray opening/closing operation. Here, a non-volatile memory such as a flash memory may be used as the memory 26, or an internal memory included in the controller 23 may be used as the memory 26.

The controller 23 decides whether or not the tray opening/closing operation is completed, based on a counter e.m.f detected in the counter e.m.f detector 25 and a time counted by the timer 27. Hereinafter, this will be described in detail.

Figure 5:
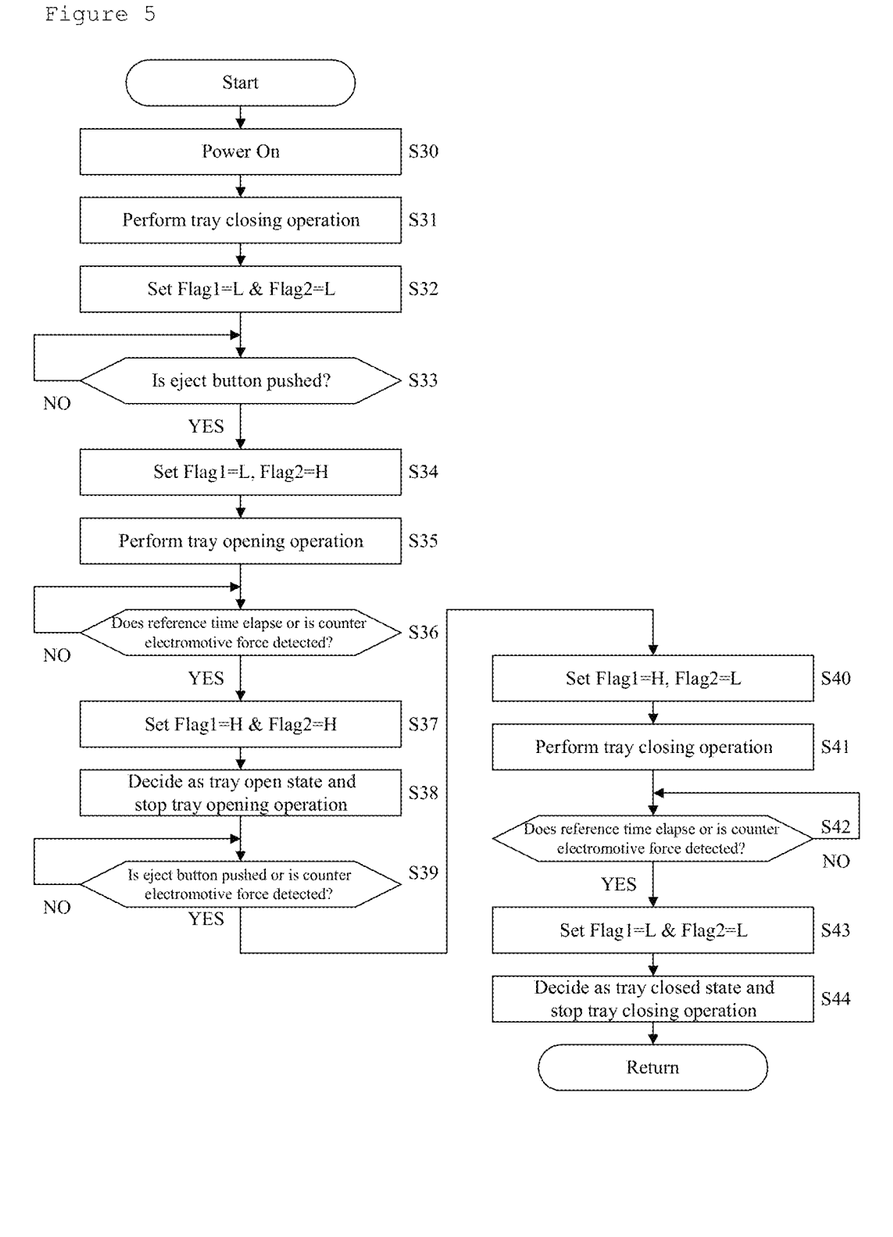
FIG. 5 is a flowchart illustrating a method for controlling a tray in the optical disc drive according to an exemplary embodiment of the present invention.

FIG. 5 is a flowchart illustrating a method for controlling the tray in the ODD according to an exemplary embodiment of the present invention.

For example, in a case where power is normally applied to the ODD or power is on after interruption of power occurs (S30), the controller 23 controls the motor driver 22 to drive the loading motor 21, thereby performing a tray closing operation of inserting the tray 20 into the inside of the ODD (S31). The controller 23 sets both the first and second flags Flag1 and Flag2 to be in the low state L (S32).

If a user pushes the eject button 24 in this state (S33), the controller 23 maintains the first flag Flag1 set in the memory 26 to be in the low state L, and changes the state of the second flag Flag2 from the low state L to the high state H (S34). The controller 23 controls the motor driver 22 to drive the loading motor 21, thereby performing a tray opening operation of extracting the tray 20 to the outside of the ODD (S35).

In a case where the time counted by the timer 27 from the time when the tray opening operation is started exceeds a previously set reference time (e.g., 2 seconds) or in a case where the counter e.m.f generated because the loading motor 21 is not rotated any more due to the completion of the tray opening operation is detected by the counter e.m.f detector 25 (S36), the controller 23 changes the state of the first flag Flag1 set in the memory 26 from the low state L to the high state H (S37). The controller 23 controls the motor driver 22 to stop the rotation of the loading motor 21, thereby completing the tray opening operation (S38).

If the counter e.m.f is generated in the loading motor 21 as the user pushes the eject button 24 or forcibly pushes the tray 20 in the state in which the tray 20 is opened (S39), the controller 23 maintains the first flag Flag1 set in the memory 26 to be in the high state H, and changes the state of the second flag Flag2 from the high state H to the low state L (S40).

Figure 6:
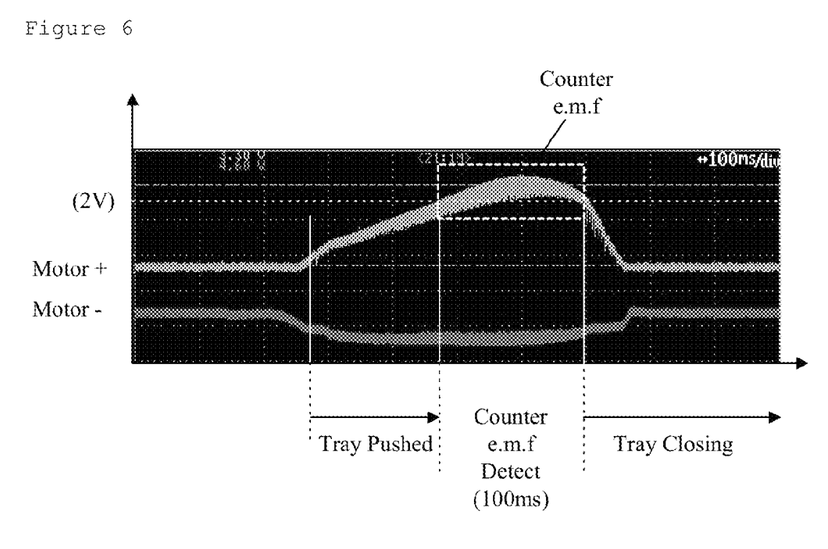
FIG. 6 illustrates a counter electromotive force generated in a loading motor of the optical disc drive to which the present invention is applied.

If the user forcibly pushes the tray 20, the counter e.m.f of a high level (e.g., 2V or more) is generated in the loading motor 21 for a predetermined time (e.g., 1000 ms) as shown in FIG. 6. Therefore, although the eject button 24 is not pushed, the controller 23 performs a tray closing operation, based on the states of the first and second flags and the detected counter e.m.f (S41).

In a case where the time counted by the timer 27 from the time when the tray closing operation is started as described above exceeds a previously set reference time (e.g., 2 seconds) or in a case where the counter e.m.f generated because the loading motor 21 is not rotated any more due to the completion of the tray closing operation is detected by the counter e.m.f detector 25 (S42), the controller 23 changes the state of the first flag Flag1 set in the memory 26 from the high state H to the low state L (S43). The controller 23 controls the motor driver 22 to stop the rotation of the loading motor 21, thereby completing the tray closing operation (S44).

Meanwhile, in a case where the eject button 24 is pushed in a state in which the first and second flags are set to different values, i.e., while the tray opening operation or tray closing operation is performed, the controller 23 may continuously perform the tray opening operation or tray closing operation while disregarding the manipulation of the eject button 24. Alternatively, the controller 23 may perform the opposite operation to the tray opening operation or tray closing operation by reflecting a user's manipulation intension. If the manipulation of the eject button 24 is detected under the tray opening operation, i.e., in the state in which the first flag is in the low state L and the second flag is in the high state H, the controller 23 controls the motor driver 22 to rotate the loading motor 21, thereby performing the tray closing operation of inserting the tray into the inside of the ODD. If the reference time elapses or the counter e.m.f is detected, the controller 23 decides that the tray closing operation has been completed, and changes the state of the second flag from the high state H to the low state L. The opposite case is similar.

The user may apply a force to the tray 20 in the opposite direction to that in which the tray 20 moves in a state in which the first and second flags are set to different values, i.e., while the tray opening operation or tray closing operation is performed, exactly, in a state in which the tray 20 is not completely inserted into the inside of the ODD or is not completely extracted from the outside of the ODD, that is the user may push the tray 20 in the direction of the inside of the ODD under the tray opening operation or may pull the tray in the direction of the outside of the ODD under the tray closing operation. This case is similar to that where the counter e.m.f detector 25 detects the counter e.m.f generated because the loading motor 21 is not rotated any more due to the completion of the tray closing operation is detected by the counter e.m.f detector 25. Therefore, these cases are necessarily distinguished from each other.

When the loading motor 21 is normally driven, the controller 23 can manage the time until the tray 20 is completely extracted from the inside to the outside of the ODD or a second reference time until the tray 20 is completely inserted in the inside of the ODD in the state in which the tray 20 is completely extracted to the outside of the ODD. Hence, in a case where the counter e.m.f is detected in a state in which the second reference time does not elapse, the controller 23 decides that the user has applied the force in the opposite direction to that in which the tray opening operation or tray closing operation is performed. The controller 23 controls the motor driver 22 to change the rotation direction of the loading motor 21, thereby performing the opposite operation to the tray opening operation or tray closing operation.

In a case where the eject button 24 is repetitively manipulated tree times or more while the tray 20 moves or in a case where the user repetitively performs an operation of pulling or pushing the tray 20 while the tray 20 moves, the controller 23 may set a third flag for indicating a movement direction of the tray 20 or a rotation direction of the loading motor 21 to be in any one of the low and high states.

In a case where it is decided that the tray 20 has been completely closed or opened due to the movement of the tray 20, the controller 23 may change any one of the values of the first and second flags, based on the value of the third flag, e.g., to have the same value as the value of the third flag, so that the first and second flags indicate the close or open state of the tray 20.

For example, if the eject button 24 is manipulated in the state in which the tray 20 is closed (both the first and second flags are in the low state), the controller 23 changes the state of the second flag from the low state to the high state (since the first and second flags are different from each other, the different states of the first and second flags correspond to the state in which the tray moves), and sets the third flag, for example, to be in the high state for indicating the direction in which the tray 20 is opened. In this case, if the counter e.m.f is detected and the driving of the loading motor 21 is stopped after the second reference time elapses, the controller 23 decides that the tray 20 is opened, and changes the state of the first flag from the low state to the high state that is a value of the third flag. If the eject button 24 is manipulated before the second reference time elapses while the tray 20 moves, the loading motor 21 is driven in a direction in which the tray 20 is closed, and the state of the third flag is set to the low state for indicating the direction in which the tray 20 is closed. Then, if the driving of the loading motor 21 is stopped due to the counter e.m.f detected after a predetermined time elapses, the controller 23 decides that the tray 20 is completely closed, and changes the state of the second flag from the high state to the low state that is a value of the third flag.

As described above, the tray opening operation or tray closing operation can be exactly performed by applying the counter e.m.f detection and the algorithm using the flags without using separate switches for checking the open/close state of the tray.

While we have shown and described several embodiments in accordance with the present invention, it is understood that the same is not limited thereto but is susceptible of numerous changes and modifications as known to those skilled in the art, and we therefore do not wish to be limited to the details shown and described herein but intended to cover all such changes and modifications as are encompassed by the scope of the appended claims.

What is claimed is:

1. A method for controlling a tray in an optical disc drive, comprising:
setting first and second flags for indicating a current state of the tray in the optical disc drive, wherein the state of the tray includes an open state, a closed state and a state in which the tray moves; and controlling a movement operation of the tray, based on values of the two flags and a time when a counter electromotive force (counter e.m.f) is generated in a motor for moving the tray, wherein if a tray closing operation is requested in the state in which the tray is opened is received, the tray closing operation is performed by controlling the motor, or if a tray opening operation is requested in the state in which the tray is closed is received, the tray opening operation is performed by controlling the motor, and the value of the second flag is changed, and wherein a third flag for indicating a movement direction of the tray is set under the movement of the tray, and if it is decided that the movement of the tray is stopped, any one of the values of the first and second flags is changed based on a value of the third flag.

2. The method of claim 1, wherein, if the counter e.m.f is detected in the motor after a first time from the time when the tray closing operation or the tray opening operation is started, the driving of the motor is stopped, and the value of the first flag is changed.

3. The method of claim 2, wherein, if the counter e.m.f is detected in the motor or an eject button is manipulated within a time shorter than the first time from the time when the tray closing operation is started, the tray opening operation is performed by controlling the motor, or if the counter e.m.f is detected in the motor or an eject button is manipulated within a time shorter than the first time from the time when the tray opening operation is started, the tray closing operation is performed by controlling the motor.

4. The method of claim 1, wherein the request of performing the tray closing operation or the tray opening operation is determined by whether the eject button is manipulated or whether the counter e.m.f is detected in the motor within a time shorter than a first time.

5. An optical disc drive comprising a tray, an eject button, a motor for moving the tray, a timer, a detector for detecting a counter e.m.f generated in the motor, and a controller, wherein the controller sets first and second flags for indicating a current state of the tray, the state of the tray including an open state, a closed state and a state in which the tray moves, and controls a movement operation of the tray, based on values of the two flags and a time when the counter e.m.f detected through the timer and the detector is generated, wherein, if a tray closing operation is requested in the state in which the tray is opened is received, the controller performs the tray closing operation by controlling the motor, or if a tray opening operation is requested in the state in which the tray is closed is received, the controller performs the tray opening operation by controlling the motor, and the controller changes the value of the second flag, and wherein the controller sets a third flag for indicating a movement direction of the tray under the movement of the tray, and if it is decided that the movement of the tray is stopped, the controller changes any one of the values of the first and second flags based on a value of the third flag.

6. The optical disc drive of claim 5, wherein, if the counter e.m.f is detected by the detector after a first time from the time when the tray closing operation or the opening operation is started, the controller stops the driving of the motor and changes the value of the first flag.

7. The optical disc drive of claim 6, wherein, if the counter e.m.f is detected by the detector or an eject button is manipulated within a time shorter than the first time from the time when the tray closing operation is performed, the controller performs the tray opening operation by controlling the motor, or if the counter e.m.f is detected by the detector or an eject button is manipulated within a time shorter than the first time from the time when the tray opening operation is performed, the controller performs the tray closing operation by controlling the motor.

8. The optical disc drive of claim 5, wherein, if the eject button is manipulated or the counter e.m.f is detected by the detector within a time shorter than a first time, the controller decides that the request of performing the tray closing operation or the tray opening operation is received.

* * * * *